(12) United States Patent
Hasegawa

(10) Patent No.: US 8,326,123 B2
(45) Date of Patent: Dec. 4, 2012

(54) MOVIE PLAYER, MOBILE TERMINAL, AND DATA PROCESSING METHOD OF MOBILE TERMINAL

(75) Inventor: Junichi Hasegawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1815 days.

(21) Appl. No.: 11/258,772

(22) Filed: Oct. 25, 2005

(65) Prior Publication Data

US 2006/0088281 A1  Apr. 27, 2006

(30) Foreign Application Priority Data

Oct. 26, 2004 (JP) ................................ 2004-310913

(51) Int. Cl.
*H04N 9/80* (2006.01)
(52) U.S. Cl. ........................................................ 386/252
(58) Field of Classification Search .................... 386/46
See application file for complete search history.

(56) References Cited

U.S. PATENT DOCUMENTS

| 7,106,836 B2 | 9/2006 | Neuhaus | |
|---|---|---|---|
| 2005/0053202 A1 | 3/2005 | Neuhaus | |
| 2005/0202854 A1* | 9/2005 | Kortum et al. | 455/571 |
| 2006/0020991 A1* | 1/2006 | Goto | 725/106 |

FOREIGN PATENT DOCUMENTS

| JP | 11-252216 | 9/1999 |
|---|---|---|
| JP | 2001-177608 | 6/2001 |
| WO | 03055158 A1 | 7/2003 |
| WO | 03081878 A1 | 10/2003 |

* cited by examiner

*Primary Examiner* — William C Vaughn, Jr.
*Assistant Examiner* — Daniel Tekle
(74) *Attorney, Agent, or Firm* — DLA Piper LLP (US)

(57) ABSTRACT

A movie video player able to differentiate data set at the time of an incoming call and thereby able to prevent copyright infringement when switching sound data, that is, a movie player comprising a movie playback unit for playing back a movie including audio and video, a display unit able to display at least the played back movie and text, a text-to-speech unit having a text-to-speech function of converting to speech text being displayed on the display unit and the state of the device, and a controller, wherein when a predetermined event occurs for starting up the text-to-speech function during the playback of a movie, the controller stops only the audio output of the movie and activates the text-to-speech function in a first case where the video and audio data can be separated, and the controller stops both the video and audio data of the movie and activates the text-to-speech function in a second case where the video and audio cannot be separated, and a mobile terminal and a data processing method of a mobile terminal.

12 Claims, 4 Drawing Sheets

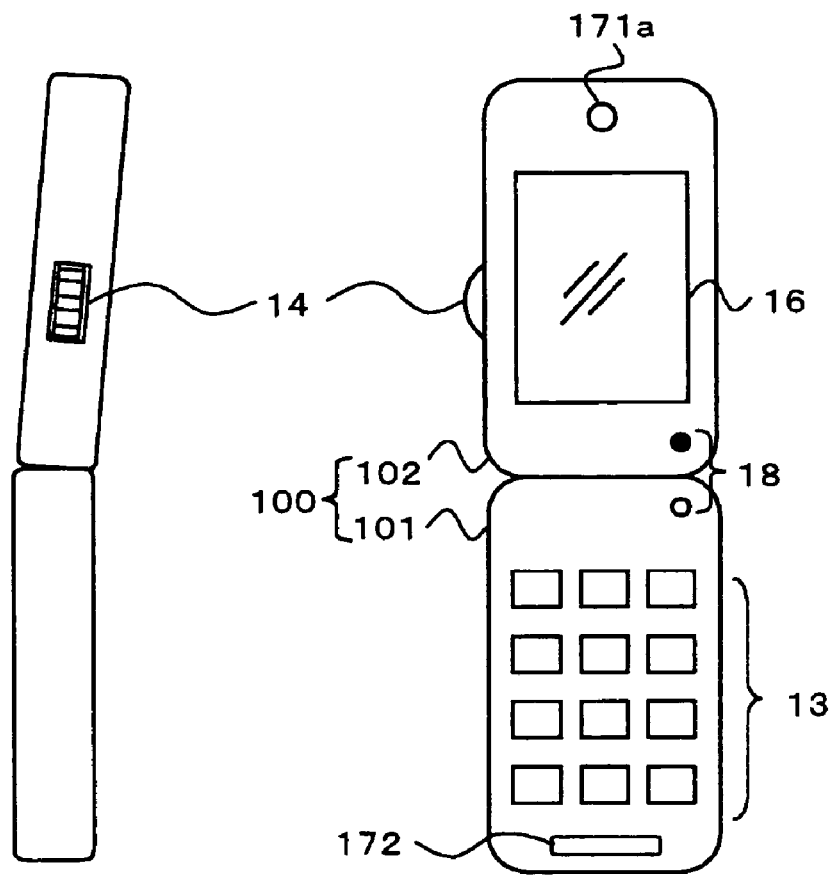
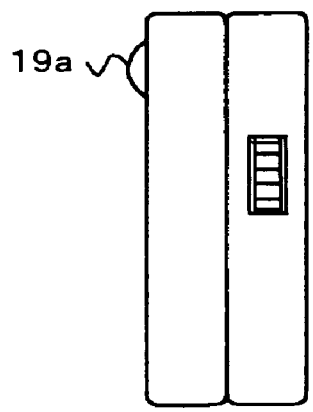
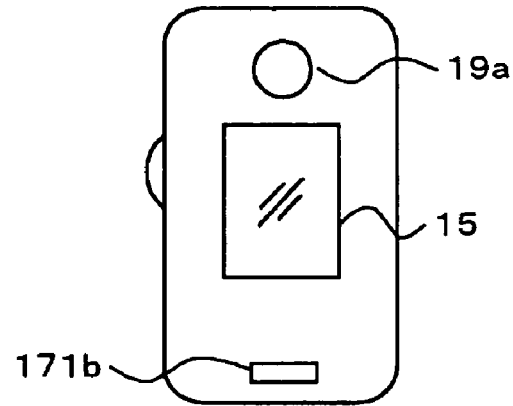
FIG. 2C  FIG. 2A
FIG. 2D  FIG. 2B

※PRESET VIDEO IS PREVIOUSLY PREPARED VIDEO DATA NOT HAVING COPYRIGHT

MOVIE PLAYER, MOBILE TERMINAL, AND DATA PROCESSING METHOD OF MOBILE TERMINAL

BACKGROUND OF THE INVENTION

1. Field of the Invention

The present invention relates to a movie player provided with a display function, a text-to-speech function, and a movie playback function, a mobile phone or other mobile terminal provided with this movie player, and a data processing method of the mobile terminal.

2. Description of the Related Art

In recent years, as a mobile terminal or other electronic device, a mobile phone speaking aloud the name of a function etc. set by operation of a key when the key is operated has been proposed (see for example Japanese Unexamined Patent Publication (Kokai) No. 11-252216). This mobile phone has a plurality of keys, a controller for setting a function in accordance with operation of one or more keys of the provided at the phone, and a speech synthesizer for outputting by speech the name of the function set linked with the key operations.

Some mobile phones and other mobile terminals can report an incoming call or received message by the means of designating data including video and audio (movie data) and displaying that video and generating the audio. Further, some report an incoming call or received message by the means of synthesizing speech and speaking aloud the name of the sender. Therefore, it is predicted that a demand will arise in the market for synthesizing speech and speaking aloud the name of the sender even when using movie data to report an incoming call or received message.

However, if designing a mobile terminal satisfying such a demand, the speech speaking aloud the name of the sender and the audio of the movie data would end up competing. In this regard, the intent of the producer of the movie data should also be respected. Namely, the data should be played back while maintaining the format intended by the producer of the movie data. In this way, interruption processing for reporting the state of the device by speech such as reporting an incoming call or received message by speaking aloud the name of the sender at the time of the call or message, when performed when playing back movie data, should be performed in a manner maintaining as much as possible the format intended by the producer of movie data.

SUMMARY OF THE INVENTION

An object of the present invention is to provide a movie player, a mobile terminal, and a data processing method of the mobile terminal not destroying the format intended by the producer of movie data as much as possible even when the interruption processing is performed for reporting the state of the device during playback of movie data including video and audio.

According to a first aspect of the present invention, there is provided a movie player comprising a movie playback unit for playing back a movie including audio and video, a display unit for displaying at least the played back movie and text, a text-to-speech unit having a text-to-speech function of converting to speech text being displayed on the display unit and the state of the device, and a controller, wherein when a predetermined event occurs for starting up the text-to-speech function during the playback of a movie, the controller stops only the audio output of the movie and activates the text-to-speech function in a first case where the video and audio data can be separated, and the controller stops both the video and audio data of the movie and activates the text-to-speech function in a second case where the video and audio cannot be separated.

Preferably, the controller makes the movie playback unit play back the movie again when the text-to-speech operation ends and the movie is still being played back.

Preferably, the controller refers to additional information in the played back movie to judge whether predetermined data is included and thereby whether the video and audio data can be separated.

According to a second aspect of the present invention, there is provided a mobile terminal comprising a movie playback unit for playing back a movie including audio and video, a display unit for displaying at least the played back movie and text, a text-to-speech unit having a text-to-speech function of converting to speech the text being displayed on the display unit and the state of the device, a communication unit for detecting at least an incoming call and received message, and a controller, wherein when an incoming call or received message is detected at the communication unit and the movie playback unit is playing back the movie to report the call or message and when a predetermined event occurs for starting up the text-to-speech function during the playback of a movie, the controller stops only the audio output of the movie and activates the text-to-speech function in a first case where the video and audio data can be separated, and the controller stops both the video and audio data of the movie and activates the text-to-speech function in a second case where the video and audio cannot be separated.

Preferably, the controller makes the movie playback unit play back the movie again when the text-to-speech operation ends and processing for stopping report of an incoming call or received message has not yet been performed.

Preferably, the controller refers to additional information in the played back movie to judge whether predetermined data is included and thereby whether the video and audio data can be separated.

Preferably, the text-to-speech unit has a function of converting to speech information on the sender or information relating to the e-mail being received at the time of an incoming call or received message.

Preferably, the text-to-speech unit converts to speech information on the sender or information relating to the e-mail being received in response to a predetermined operation at the time of an incoming call or received message.

Preferably, the controller judges whether or not the video data and the audio data of the movie can be separated according to whether or not data indicating a copyright is included in the additional information of the movie.

According to a third aspect of the present invention, there is provided a data processing method of a mobile terminal having a movie playback function able to play back a movie including audio and video, a display function able to display at least the played back movie and text, a text-to-speech function of converting to speech text being displayed on a display unit and the state of the device, and a communication function able to detect at least an incoming call and received message, comprising steps of judging whether or not a predetermined event occurs for activating the text-to-speech function when detecting an incoming call or received message by the communication function and playing back the movie by the movie playback function to report the incoming call or received message, judging whether or not video and audio data can be separated when the event occurs, stopping only the audio output of the movie and activating the text-to-speech function when separation is possible, and stopping both the video and audio data of the movie and activating the text-to-speech function when separation is not possible.

BRIEF DESCRIPTION OF THE DRAWINGS

These and other objects and features of the present invention will become clearer from the following description of the preferred embodiments given with reference to the attached drawings, wherein:

FIGS. 2A to 2D are views illustrating an example of the outer appearance of a mobile phone, in which FIG. 2A is a view of the outer appearance of the front in an opened state, FIG. 2B is a view of the outer appearance of the back in a closed state, FIG. 2C is a view of the outer appearance of the side in the opened state, and FIG. 2D is a view of the outer appearance of the side in the closed state;

DESCRIPTION OF THE PREFERRED EMBODIMENTS

Below, an embodiment of the present invention will be explained with reference to the attached drawings.

Figure 1:
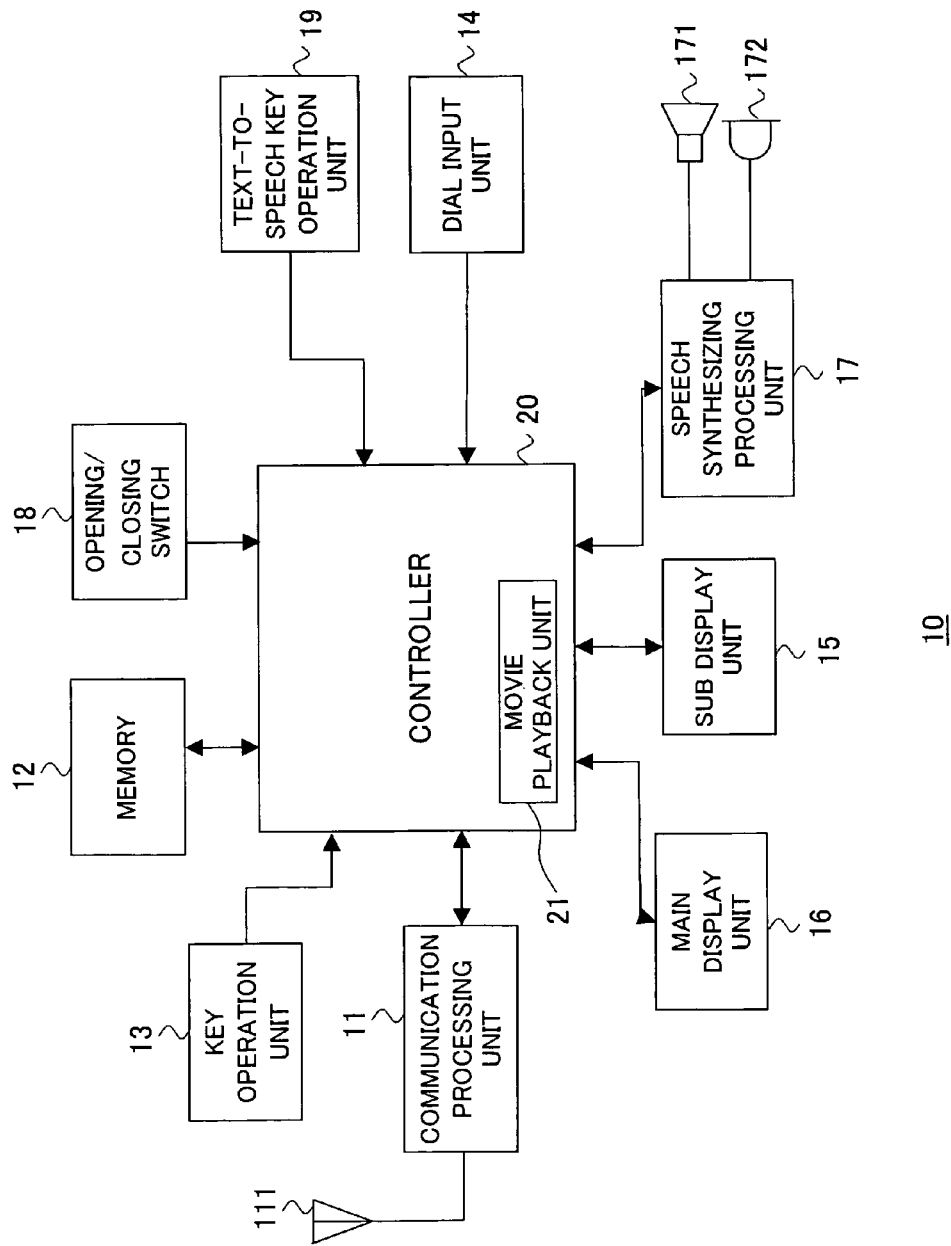
FIG. 1 is a block diagram illustrating an example of the system configuration of a mobile phone.

FIG. 1 is a block diagram illustrating an example of a system configuration of a mobile terminal of the present invention constituted by a mobile phone 10. FIGS. 2A to 2D are views illustrating an example of the outer appearance of the mobile phone 10. The mobile phone 10 is a so-called flip-open type mobile phone having a movement mechanism. FIG. 2A is a front view in an opened state, FIG. 2B is a front view in a closed state, FIG. 2C is a side view in the opened state, and FIG. 2D is a side view in the closed state.

The mobile phone 10 according to the present embodiment has, in addition to the usual functions of a mobile phone, a movie playback function for playing back a movie including audio and video, a display function able to display at least the played back movie and text, a text-to-speech function able to convert the text being displayed on the display unit and the state of device to speech, and a communication function able to detect at least an incoming call and received message.

The mobile phone 10 of the present embodiment is configured so that when detecting an incoming call or received message by the communication function and playing back a movie by the movie playback function to report the call or message, it judges whether or not a predetermined event (for example a predetermined key operation) has occurred for activating the text-to-speech function, judges whether or not the video and audio data can be separated when such an event has occurred, stops only the audio output of the movie and activates the text-to-speech function of the text-to-speech unit when separation is possible, and stops both the both video and audio data of the movie and activates the text-to-speech function of the text-to-speech unit when the separation is not possible. According to the mobile phone 10, it is possible to prevent as much as possible the playback of movie data in a manner destroying the format intended by its producer even when interruption processing is performed for reporting the state of the device during playback of movie data including video and audio.

Further, the mobile phone 10 has a function of making the movie playback unit play back the movie again when the text-to-speech conversion ends and processing has still not been performed for stopping the report of the incoming call or received message. The mobile phone 10 refers to additional information in the played back movie to judge whether the video and audio data can be separated. The mobile phone 10 also has a function of converting to speech information on the sender or information relating to the e-mail being received at the time of the call or message. Alternatively, the mobile phone 10 converts to speech information on the sender or information relating to the e-mail being received in response to a predetermined operation at the time of the call or message. Furthermore, in the mobile phone 10, the controller may judge whether or not the video data and audio data of the movie can be separated according to whether or data indicating a copyright is included in the additional information of the movie.

Below, the configurations and functions of the different parts of the mobile phone 10 according to the present embodiment and the text-to-speech conversion control will be explained in sequence.

As shown in FIG. 1, the mobile phone 10 has a communication processing unit 11 including a transmission/reception antenna 111, a memory 12, a key operation unit 13, a dial input unit 14, a sub display unit 15, a main display unit 16, a speech synthesizing processing unit 17 including a speaker 171 and a microphone 172 and including a function as a text-to-speech unit, an opening/closing switch 18, a text-to-speech key input unit 19, and a controller (CPU) 20 including a movie playback and speech control function. Further, the controller 20 has a movie playback unit 21. Further, as shown in FIG. 2A, a main case 100 of the mobile phone 10 is configured by a first housing constituted by a key input side main case 101 and a second housing constituted by a display side main case 102 connected by a not shown movement mechanism to form an openable/closeable state.

The communication processing unit 11 performs wireless communication operations via a base station, for example, calling up a phone number and sending or receiving e-mail. The communication processing unit 11 is connected to the transmission/reception antenna 111. It modulates audio information, e-mail, etc. processed at the controller 20 and transmits the same to a not shown base station by the transmission/reception antenna 111 in order to perform wireless communication utilizing wireless signals. Further, the communication processing unit 11 demodulates various information such as e-mails, movies, and audio information transmitted wirelessly from the base station and received at the transmission/reception antenna 111 and outputs the same to the controller 20. The communication processing unit 11 is configured so as to be able to detect the receipt of e-mails, movies, audio information, etc. and messages. Note that the transmission/reception antenna 111 is built in the key input side main case 101 or the display side main case 102 and not exposed to the outside in FIG. 2.

The memory (storage unit) 12 is configured by an EEPROM or other nonvolatile memory and stores a control program for transmitting and receiving speech and mail, an Internet browser, message data, an address book registering names and phone numbers, etc. The memory 12 stores the video data and audio data under the control of the controller 20. The memory 12 stores a text-to-speech database including text required for the text-to-speech function explained later and explanations related to the text. In this database, the text for conversion to speech is systematically arranged in context so as to form sentences. The memory 12 stores "standard text", "shortened text", "explanatory text", and "control tables" corresponding to a menu displayed by the display unit.

The key operation unit 13 has an end (hang up)/power key, a start (call) key, tenkeys corresponding to numerals, etc. By the operation by the user of these keys, the user outputs input information to the controller 20. Further, by the operation of the key operation unit 13, it is possible to set whether or not to speak aloud the items of the control table of the text-to-speech function stored in the memory 12 (ON/OFF) through the controller 20.

The dial input unit 14 is a dial type of input unit. It is arranged on the side face of the display side main case 102 so as to facilitate operation by the thumb of the user when the user holds the mobile phone 10 in the opened state as shown in FIG. 2C and is configured so that upward and downward, that is, two-way, operation is possible. By operating the dial input unit 14, the user can change the output volume of the audio and the text size displayed on the sub display unit 15 and the main display unit 16. Further, as apparent from FIG. 2C and FIG. 2D, when comparing the dial input unit 14 between the closed state and the opened state, the two-way upward and downward operation directions are physically reversed, but in the present embodiment, the controller 20 controls things so that the user is not made to feel odd by making the operation direction as seen from the user and the action with respect to the operation (for example, the above change of volume and display font size (displayed text size)) always coincide.

The sub display unit 15 has a liquid crystal display (LCD) or other display viewed by the user in the closed state as shown in FIG. 2B. The main display unit 16 has an LCD or other display viewed by the user in the opened state as shown in FIG. 2A. The sub display unit 15 and the main display unit 16 display text of a received e-mail and a variety of text data etc. stored in the memory 12 in the closed state and the opened state under the control of the controller 20. Mainly, movies of for example the 3g2 format of the MPEG-4 standard are displayed on the main display unit 16 under the control of the controller 20.

The speech synthesizing processing unit 17 has an audio processing circuit to which a speaker 171 for outputting audio and a microphone 172 for inputting audio are connected for the call function. The speech synthesizing processing unit 17 performs predetermined processing with respect to the audio picked up the microphone 172 and supplies the same to the controller 20. Further, the speech synthesizing processing unit 17 performs predetermined processing with respect to the audio information supplied by the controller 20 and makes the speaker 171 output it. Namely, the speech synthesizing processing unit 17 generates an audio signal from the audio data output from the controller 20 and outputs it to the speaker 171. Further, the speech synthesizing processing unit 17 generates audio data from the audio signal output from the microphone 17 and outputs it to the controller 20.

Further, as shown in FIGS. 2A and 2B, the speaker 171 includes a speech speaker 171*a* and a ringer speaker 171*b*, that is, two audio output units, and outputs audio of the result of the processing of the text-to-speech function. Further, the speech synthesizing processing unit 17 has a speech synthesizing circuit which, at the time of text-to-speech conversion, converts text data or explanations read out and extracted from the memory 12 to audio data in the controller 20 and synthesizes speech by the audio output unit constituted by the speech speaker 171*a* or the ringer speaker 171*b*.

The speech synthesizing processing unit 17 is configured to allow selection of an automatic text-to-speech setting for automatic text-to-speech conversion when changing to a display screen including text which can be converted to synthesized speech and a manual text-to-speech setting for text-to-speech conversion after a request for speech synthesis. Whether the setting is the automatic text-to-speech setting or manual text-to-speech setting is determined for example by the controller 20 referring to the control table stored in the memory 12. For example, the controller 20 judges whether the reason for starting the text-to-speech conversion is manual text-to-speech conversion having been instructed by the text-to-speech key operation unit 19 or is automatic text-to-speech conversion in accordance with a change in state inside the terminal as and reports the result to the speech synthesizing processing unit 17.

The opening/closing switch 18 is a switch for detecting the open/close state of the mobile phone 10. For the specific configuration of the opening/closing switch 18, various techniques can be applied. For example as shown in FIG. 2A, a configuration providing contacts in the key input side main case 101 and the display side main case 102 and exhibiting the OFF state by making both contacts electrically nonconductive in the closed state (FIG. 2B) can be employed. Alternatively, it is also possible to configure the equipment so that the opening/closing switch 18 becomes the ON state when the mobile phone 10 is in the closed state and the opening/closing switch 18 becomes the OFF state when the mobile phone 10 is in the opened state. The controller 20 can detect the state of the opening/closing switch so as to distinguish the open/close state of the mobile phone 10.

The text-to-speech key operation unit 19 is configured by a pushbutton 19*a* arranged at the center of the display side main case 102 and an input circuit for the switch input by the pushbutton as shown in FIG. 2B. The mobile phone 10 in the present embodiment has a text-to-speech function and is controlled by the controller 20 so that when the pushbutton 19*a* is depressed (operated), it outputs as speech the text being displayed, for example, the name of the other party, at the time of the reporting a call or message or related explanations by the ringer speaker 21 in the closed state and outputs as speech the same by the speech speaker 171 in the opened state. The controller 20 explained later distinguishes between the opened/closed state of the mobile phone 10 by the output of the opening/closing switch 18 and reports the destination of audio output for text-to-speed conversion to the speech synthesizing processing unit 17.

The controller 20 is mainly configured by a microcomputer which controls the mobile phone 10 as a whole. For example, the controller 20 controls the wireless transmission/reception of various information in the communication processing unit 11, the processing of movies and audio information for the speech synthesizing processing unit 17, the display of information to the main display unit 16, the processing in response to the input information of the key input unit 13, access with respect to the memory 12, etc. The controller 20 has a movie playback unit 21 and has a display timing control function able to decode the movie data of for example the 3g2 format of the MPEG-4 standard received via the communication processing unit 11, generating the display use data, and displaying it on the main display unit 16.

When the communication processing unit 11 detects an incoming call or received message, the movie playback unit 21 is playing back a movie to report the call or message, and a predetermined event occurs for activation of the text-to-speech function including at the speech synthesizing processing unit 17, the controller 20 performs control for stopping only the audio output of an incoming movie including audio and activating the text-to-speech function when the video and audio data can be separated and for stopping the playback of both the video and audio data of the movie and activating the text-to-speech function when separation is not possible.

The controller 20 makes the movie playback unit 21 play back the movie again when the text-to-speech conversion stopping playback of both the video and audio data of the movie ends and processing for switching to an answer phone function is not carried out during an incoming call response operation and processing for stopping the report of the call or message has still not been performed. The controller 20 refers to the additional information in the played back movie to judge whether the video and audio data can be separated. Specifically, the controller 20 judges whether or not the video data and audio data of the movie can be separated according to whether or not data indicating a copyright is included in the additional information of the movie explained later.

Further, the controller 20 controls the text-to-speech function including the speech synthesizing processing unit 17 so as to automatically convert to speech information on the sender or information relating to an e-mail being received at the time of a call or message and so as to convert to speech information concerning the sender or e-mail being received in response to a predetermined operation at the time of a call or message.

The controller 20 executes the text-to-speech function of the displayed text when the user operates the pushbutton 19a. At that time, the text-to-speech function used is not of a type outputting audio data for text-to-speech conversion, but of a type extracting/generating text and converting to speech the text and the explanations thereof.

Further, the controller 20 judges whether the reason for the start of the text-to-speech conversion is an instruction for text-to-speech conversion by the text-to-speech key operation unit 19 or automatic text-to-speech conversion in response to a change in status inside the terminal. This automatic text-to-speech conversion is based on for example the remaining charge of the battery or a change in the state of the radio signal. At the time of this automatic text-to-speech conversion, the controller 20 refers to the control table of the text-to-speech function stored in the memory 12.

Here, the structure of the movie data in the present embodiment will be explained with reference to FIG. 3.

Figure 3:
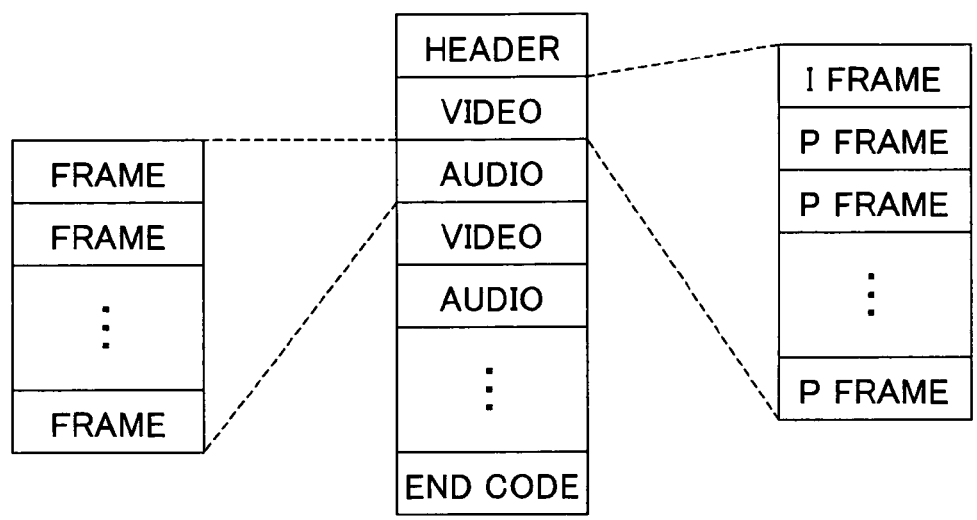
FIG. 3 is a diagram showing a structure of movie data in the present embodiment.

As shown in FIG. 3, a header is added to the head of the movie data. After the header, the video data (Video) and the audio data (Audio) are alternately arranged. An end code indicating the end of the data is added to the tail of the data. The video data is comprised of frames. While depending on the design of the individual device, for example one second of movie data is comprised of 15 frames of video data. Further, the frames come in two types: I frames and P frames. An I frame is a frame serving as the reference for composing the video and is obtained by encoding one complete still image. A P frame is obtained by encoding only the difference of the immediately preceding I frame or P frame and the actual still image. The video data, as shown in FIG. 3, includes an I frame followed by a plurality of P frames. In the case of for example movie data comprised of 15 frames per second, one second of video data is comprised of one I frame and 14 P frames. On the other hand, there is no concept in audio data like the I frame and P frame of video data.

Each frame of the video data includes a time base and a time increment indicating elapsed time information. The time base and time increment are defined in the MPEG standard and used as information indicating the playback interval at the time of playback of movie data. The time increment indicates the elapsed time at the time of the frame reproduction. The time base is used supplementarily and takes a value of 0 or 1.

A timetable having the frame information is stored in the header at the head of the movie data of FIG. 3. The timetable has information concerning the frame size (stsz) of the frames, frame identification information (stss), and decode interval (stts). The frame size indicates the size of each frame. The frame size is remarkably different between an I frame and a P frame. The frame identification information is used for identifying an I frame and has the number of the I frame as the information. Namely, it can be easily grasped which frame is an I frame storing a reference image. This frame identification information is used for coma feed reproduction of only the I frame at the time of fast-forwarding of movie data.

The frame is decoded at the movie playback unit 21 of the controller 20, then temporarily stored in a buffer in the controller 20. When the display of the frame one frame before is completed, it is output to for example the main display unit 16. The decode interval in the movie playback unit 21 is obtained by dividing the time from the start of playback to the end of playback in accordance with the data size of each frame and is assigned to each frame. Namely, the decode interval is the time for decoding and reproduction of the frame designated by this. When the decoding of the frame ends in the movie playback unit 21 within the assigned decode interval, the image of this frame is displayed on the display unit 16, but when the decoding of the frame does not end within the decode interval, the image of this frame is not displayed and the decoding of the next frame is carried out. Note that for the audio data as well, information corresponding to the frame size and decode interval are stored in the header.

Further, each frame of the movie data also stores frame header information indicating the header of the frame. The controller 20, when referring to the data of a frame, can search for the header of the frame based on this frame header information, then decides which of an I frame and a P frame that frame is based on the frame identification information and can acquire time information based on the time base/time increment.

Note that the header of the above figure stores the timetable having the frame information required for reproduction and is given a little comment space (free region). It is possible to enter a little text here. For example, "COPYRIGHTED" may be entered. By referring to this free region, the existence of a copyright can be determined. Further, mobile phone carriers may restrict how copyrighted movie files are handled or not allow playback in a manner not intended by the author even at the time of playback by for example prohibiting any change of the playback speed or separate playback such as playback of only the audio or playback of only the video.

The components of the mobile phone 10 were explained above. Next, the text-to-speech control of the mobile phone 10 according to the present embodiment will be explained with reference to FIG. 4.

Figure 4:
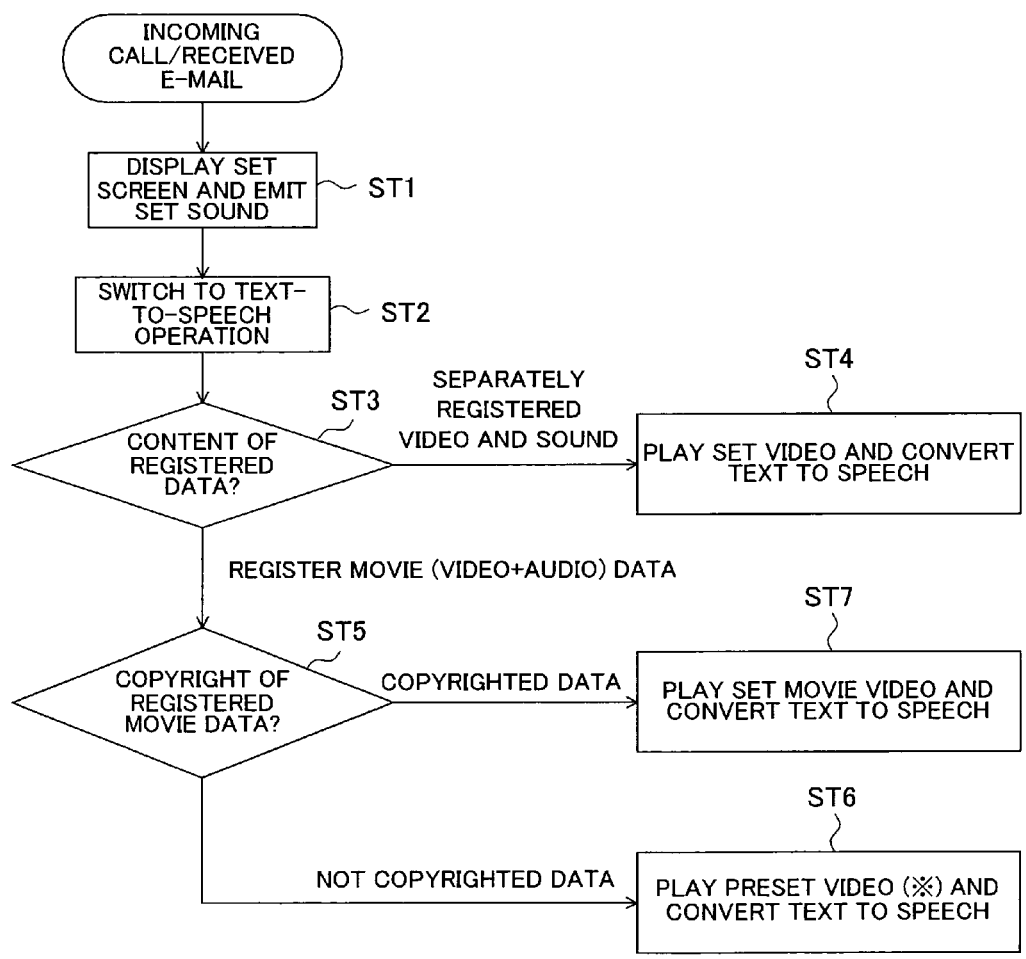
FIG. 4 is a flow chart for explaining a text-to-speech control operation according to the present embodiment.

FIG. 4 is a flow chart for explaining the text-to-speech control operation according to the present embodiment.

When the communication processing unit 11 detects an incoming call or received message, the controller 20 controls the display of the setup screen on the main display unit 16 and the sub display unit 15 and the controls of emission of the setup sounds through the speech synthesizing processing unit 17 (ST1). At this time, when the received data is movie data including audio, in parallel to the control for reporting the incoming call or received message, the controller 20 performs processing for playing back the movie in the movie playback unit 21.

Here, when the movie playback unit 21 is playing back the movie to report an incoming call or received message and a predetermined event occurs activating the text-to-speech function including the speech synthesizing processing unit 17, for example the user operates the text-to-speech key, the controller 20 switches to the control of the text-to-speech operation (ST2).

Then, the controller 20 judges whether or not the content of the registered data is separately registered video and audio data or registered movie data including video and audio data (ST3). When judging that the video and audio data are separately registered at step ST3, it has the set video displayed on the main display unit 16, and controls the speech synthesizing processing unit 17 for the predetermined text-to-speech processing (ST4). On the other hand, when the controller decides at step ST3 that the registered data content is movie data including the video and audio, it judges whether or not the registered movie data is copyrighted (ST5).

When the controller decides at step ST5 that the received movie information including the audio is not copyrighted, it decides that the video and audio data can be separated, stops only the audio output of the movie, and has the preset video of the not copyrighted video data prepared in advance displayed on the main display unit 16, then activates the text-to-speech function (ST6). On the other hand, when the controller judges at step ST5 that the received movie information including the audio is copyrighted, it decides that the video and audio data cannot be separated, stops both video and audio data of the movie, has the set movie video displayed on the main display unit 16, and performs the predetermined text-to-speech processing (ST7).

As explained above, according to the present embodiment, provision is made of the controller 20 performing control so that when the communication processing unit 11 detects an incoming call or received message and the movie playback unit 21 is playing back a movie to report the incoming call or received message, if a predetermined event occurs for activating the text-to-speech function including the speech synthesizing processing unit 17, only the audio output of the movie is stopped and the text-to-speech function is activated when for example the received movie information including audio is not copyrighted and the video and audio data can be separated, while both data of the video and audio of the movie are stopped and the text-to-speech function is activated when and where it is copyrighted and they cannot be separated, therefore the following effects can be obtained.

There is the advantage that the data set at the time of an incoming call can be differentiated and copyright violations when switching the sound data can be prevented. Namely, when playing back copyrighted movie data including audio and video data at the time of an incoming call or received e-mail, if the user performs an operation to start the text-to-speech function, it becomes possible to shift to the text-to-speech operation without, infringing any copyright. Accordingly, the user can use the text-to-speech function without having to worry about copyright infringement even when receiving movie data.

While the invention has been described with reference to specific embodiments chosen for purpose of illustration, it should be apparent that numerous modifications could be made thereto by those skilled in the art without departing from the basic concept and scope of the invention.

What is claimed is:

1. A mobile terminal comprising:
   a movie playback unit for playing back a movie including audio and video,
   a display unit for displaying at least the played back movie and text,
   a text-to-speech unit having a text-to-speech function of converting to speech the text being displayed on the display unit and the state of the device,
   a communication unit for detecting at least one of an incoming call and received message, and
   a controller, wherein
   when the incoming call or received message is detected at the communication unit and the movie playback unit is playing back the movie to report the incoming call or received message and when a predetermined event occurs for starting up the text-to-speech function during the playback of a movie,
   the controller stops only the audio output of the played back movie and activates the text-to-speech function in a first case where the played back movie is not copyrighted and the video and audio data of the played back movie can be separated, and
   the controller stops both the video and audio data of the played back movie and activates the text-to-speech function in a second case where the played back movie is copyrighted and the video and audio data of the played back movie cannot be separated.

2. A mobile terminal as set forth in claim 1, wherein the controller makes the movie playback unit play back the movie again when the text-to-speech operation ends and processing for stopping report of an incoming call or received message has not yet been performed.

3. A mobile terminal as set forth in claim 1, wherein the controller refers to additional information in the played back movie to judge whether data indicating copyright is included and thereby whether the video and audio data of the played back movie can be separated.

4. A mobile terminal as set forth in claim 1, wherein the text-to-speech unit has a function of converting to speech information on the sender or information relating to the e-mail being received at the time of an incoming call or received message.

5. A mobile terminal as set forth in claim 1, wherein the text-to-speech unit converts to speech information on the sender or information relating to the e-mail being received in response to a predetermined operation at the time of an incoming call or received message.

6. A mobile terminal as set forth in claim 1, wherein the controller judges whether or not the video data and the audio data of the played back movie can be separated according to whether or not data indicating a copyright is included in the additional information of the played back movie.

7. A data processing method of a mobile terminal having:
   a movie playback function able to play back a movie including audio and video,
   a display function able to display at least the played back movie and text,
   a text-to-speech function of converting to speech text being displayed on a display unit and the state of the device, and
   a communication function able to detect at least one of an incoming call and received message, comprising the steps of:
   judging whether or not a predetermined event occurs for activating the text-to-speech function when detecting an incoming call or received message by the communication function and playing back the movie by the movie playback function to report the incoming call or received message,
   judging whether or not video and audio data can be separated when the event occurs,
   stopping only the audio output of the played back movie and activating the text-to-speech function when the played back movie is not copyrighted and separation is possible, and stopping both the video and audio data of the played back movie and activating the text-to-speech function when the played back movie is copyrighted and separation is not possible.

8. A data processing method of a mobile terminal as set forth in claim 7, wherein the movie playback function plays back the movie again when the text-to-speech operation ends and processing for stopping report of an incoming call or received message has not yet been performed.

9. A data processing method of a mobile terminal as set forth in claim 7, wherein the method further comprises a step of referring to additional information in the played back movie to judge whether data indicating copyright predetermined data is included and thereby whether the video and audio data of the played back movie can be separated.

10. A data processing method of a mobile terminal as set forth in claim 7, wherein the text-to-speech function has a function of converting to speech information on the sender or information relating to the e-mail being received at the time of an incoming call or received message.

11. A data processing method of a mobile terminal as set forth in claim 7, wherein the text-to-speech function converts to speech information on the sender or information relating to the e-mail being received in response to a predetermined operation at the time of an incoming call or received message.

12. A data processing method of a mobile terminal as set forth in claim 7, wherein the method further comprises a step of judging whether or not the video data and the audio data of the played back movie can be separated according to whether or not data indicating a copyright is included in additional information of the played back movie.

* * * * *